(12) United States Patent
Hu

(10) Patent No.: US 7,493,884 B2
(45) Date of Patent: Feb. 24, 2009

(54) METHOD AND SYSTEM FOR REDUCING POLLUTANT EMISSIONS OF AN ENGINE

(75) Inventor: Jianrong Matthew Hu, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 161 days.

(21) Appl. No.: 11/581,048

(22) Filed: Oct. 12, 2006

(65) Prior Publication Data
US 2008/0087258 A1    Apr. 17, 2008

(51) Int. Cl.
*F02B 43/00* (2006.01)
*F02B 77/04* (2006.01)

(52) U.S. Cl. .................................. 123/198 A; 123/1 A
(58) Field of Classification Search .............. 123/1 A, 123/3, 562, 568.11, 585, 198 A
See application file for complete search history.

(56) References Cited

U.S. PATENT DOCUMENTS

| | | | |
|---|---|---|---|
| 2,456,213 A * | 12/1948 | Pele ....................... | 123/568.12 |
| 2,747,560 A * | 5/1956 | Rounds et al. .............. | 123/577 |
| 5,488,932 A | 2/1996 | Serafini | |
| 6,253,545 B1 | 7/2001 | Suzuki | |
| 6,422,219 B1 | 7/2002 | Savonen et al. | |
| 6,508,237 B2 | 1/2003 | Romzek et al. | |
| 6,742,507 B2 | 6/2004 | Keefer et al. | |
| 6,820,599 B2 | 11/2004 | Kurtz et al. | |
| 6,863,058 B2 | 3/2005 | Kurtz et al. | |
| 6,915,776 B2 | 7/2005 | zur Loye et al. | |
| 6,964,158 B2 | 11/2005 | Abdul-Khalek | |
| 6,968,678 B2 * | 11/2005 | Le Leux et al. ................ | 123/3 |
| 2005/0045163 A1 | 3/2005 | Kurtz et al. | |
| 2005/0229872 A1 | 10/2005 | Lange | |

FOREIGN PATENT DOCUMENTS

| | | | | |
|---|---|---|---|---|
| JP | 03217649 A | * | 9/1991 | |
| JP | 06207560 A | * | 7/1994 | |
| JP | 08061158 A | * | 3/1996 | |

* cited by examiner

*Primary Examiner*—Noah Kamen
(74) *Attorney, Agent, or Firm*—Finnegan, Henderson, Farabow, Garrett & Dunner

(57) ABSTRACT

A system for reducing pollutant emissions may include an engine, an intake system fluidly connected to the engine for supplying air into the engine, and a carbon dioxide supply fluidly connected to the intake system. The system may further include a controller operatively associated to the carbon dioxide supply and the intake system. The controller may be configured to control the ratio of the carbon dioxide to the intake air introduced into the engine.

18 Claims, 5 Drawing Sheets

METHOD AND SYSTEM FOR REDUCING POLLUTANT EMISSIONS OF AN ENGINE

TECHNICAL FIELD

This disclosure pertains generally to methods and systems for reduction of pollutant emissions of diesel engines and, more particularly, to methods and systems for using additives for increasing fuel efficiency and directly reducing main diesel pollutant emissions from fuel combustion process in engine cylinder.

BACKGROUND

Internal combustion engines, including diesel engines, gasoline engines, natural gas engines, and other engines known in the art, may exhaust a complex mixture of pollutants. The pollutants may be composed of gaseous compounds, which may include nitrous oxides (NOx), unburn-hydrocarbon (UHC), and solid particulate matter (PM), which may include unburned carbon particulates called soot.

High environmental standards have increased the burden on engine manufacturers to reduce the amount of nitrogen oxides (NOx) and other pollutants (e.g., PM, UHC) that may be emitted from the engines. Manufacturers also have a commitment to their customers to produce powerful yet fuel efficient engines. However, in most situations, it tends to be difficult to reduce all pollutants without aftertreatment while meeting the customer's needs for power and fuel efficiency.

NOx emission levels may be affected by engine combustion temperatures, local oxygen concentration, and residence time. The principal source of NOx is the oxidation of atmospheric nitrogen. When the temperature inside combustion chambers exceeds 1300 degrees C., nitrogen may combine with oxygen to form oxides of nitrogen, or NOx. Some engines rely on methods such as exhaust gas recirculation (EGR), for example, to lower combustion chamber temperature and reduce NOx formation. These methods may be insufficient to meet the standards promulgated by government agencies limiting NOx emissions.

One method of decreasing NOx emissions is described in U.S. Pat. No. 6,253,545 to Makoto Suzuki ("the '545 patent"). The '545 patent discloses that carbon dioxide is capable of reducing NOx in the engine exhaust gas. The '545 patent also discloses a system and method of generating carbon dioxide and introducing the carbon dioxide into the engine system. The system disclosed in the '545 patent includes a combustion device, which is separate from the internal combustion engine. Fuel (the same fuel for combustion in the internal combustion engine) and fresh air are introduced into the combustion device and are combusted within the combustion device. The exhaust gas from the combustion device is then introduced into the internal combustion engine. Because the combustion within the combustion device is operated with a stoichiometric combustion. There is enough oxygen for conversion of all the fuel into completely oxidized products. Therefore, the exhaust gas from the combustion in the combustion device includes a high amount of carbon dioxide.

While the system of the '545 patent may result in some NOx reduction, the combustion device in the '545 patent is complex and relatively expensive. Moreover, similar to other conventional methods (e.g., exhaust gas recirculation —EGR), the concentration of the carbon dioxide is still limited in the exhaust gas exiting the combustion device. As a result, this methods is only to reduce NOx of diesel engine emissions. It is desirable to directly reduce diesel emissions (NOx, UHC, PM) at same time from the combustion chamber of diesel engines.

The present disclosure is directed to overcoming one or more of the problems or disadvantages in the prior art power systems.

SUMMARY OF THE INVENTION

In one embodiment, the present disclosure is directed to a system for reducing pollutant emissions. The system may include an engine, and an intake system fluidly connected to the engine for supplying air into the engine. The system may further include a carbon dioxide supply fluidly connected to the intake system. The system may further include a controller operatively associated to the carbon dioxide supply and the intake system. The controller may be configured to control the ratio of the carbon dioxide to the intake air introduced into the engine.

In another embodiment, the present disclosure is directed to a method for reducing pollutant emissions. The method may include providing air through an air intake system to an engine. The method may also include providing carbon dioxide from a carbon dioxide supply to the engine. The method may further include providing fuel to the engine, and combusting the mixture of the fuel, air, and carbon dioxide within the engine.

In yet another embodiment, the present disclosure is directed to a machine system. The machine system may include an engine system, an air intake system fluidly connected to the engine system, a carbon dioxide supply fluidly connected to the air intake system, and a controller operatively connected to the air intake system and the carbon dioxide supply. The controller may include a first valve connected to the intake system and a second valve connected to the carbon dioxide supply. The first valve may be configured to control the air flowing into the at least one engine, and the second valve may be configured to control the carbon dioxide flowing into the at least one engine.

DETAILED DESCRIPTION

Figure 1:
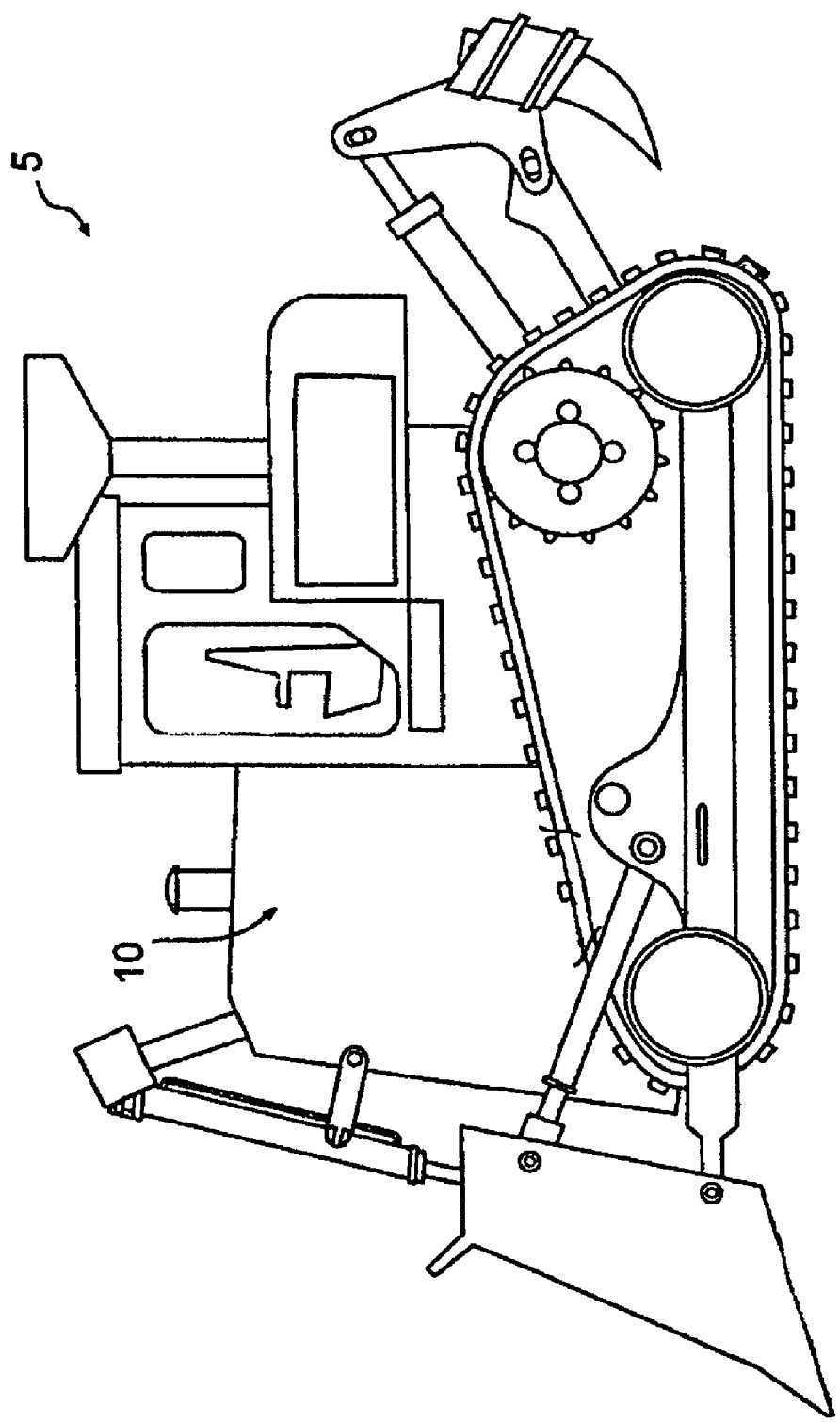
FIG. 1 shows a pictorial representation of a machine that may embody a system for reducing pollutant emissions according to an exemplary disclosed embodiment.

FIG. 1 shows a schematic representation of an exemplary machine 5 having multiple systems and components that may cooperate to accomplish a task. Machine 5 may include a diesel engine system 10, which may embody the system for reducing diesel engine pollutant emissions. Machine 5 may embody a fixed or mobile machine that performs some type of operation associated with an industry such as mining, construction, farming, transportation, or any other industry known in the art. For example, machine 5 may be an earth moving machine such as an excavator, a dozer, a loader, a backhoe, a motor grader, a dump truck, or any other earth moving machine. Additionally, machine 5 may include on-highway vehicles such as tractors, passenger cars, heavy and light trucks, and other similar vehicles.

Figure 2:
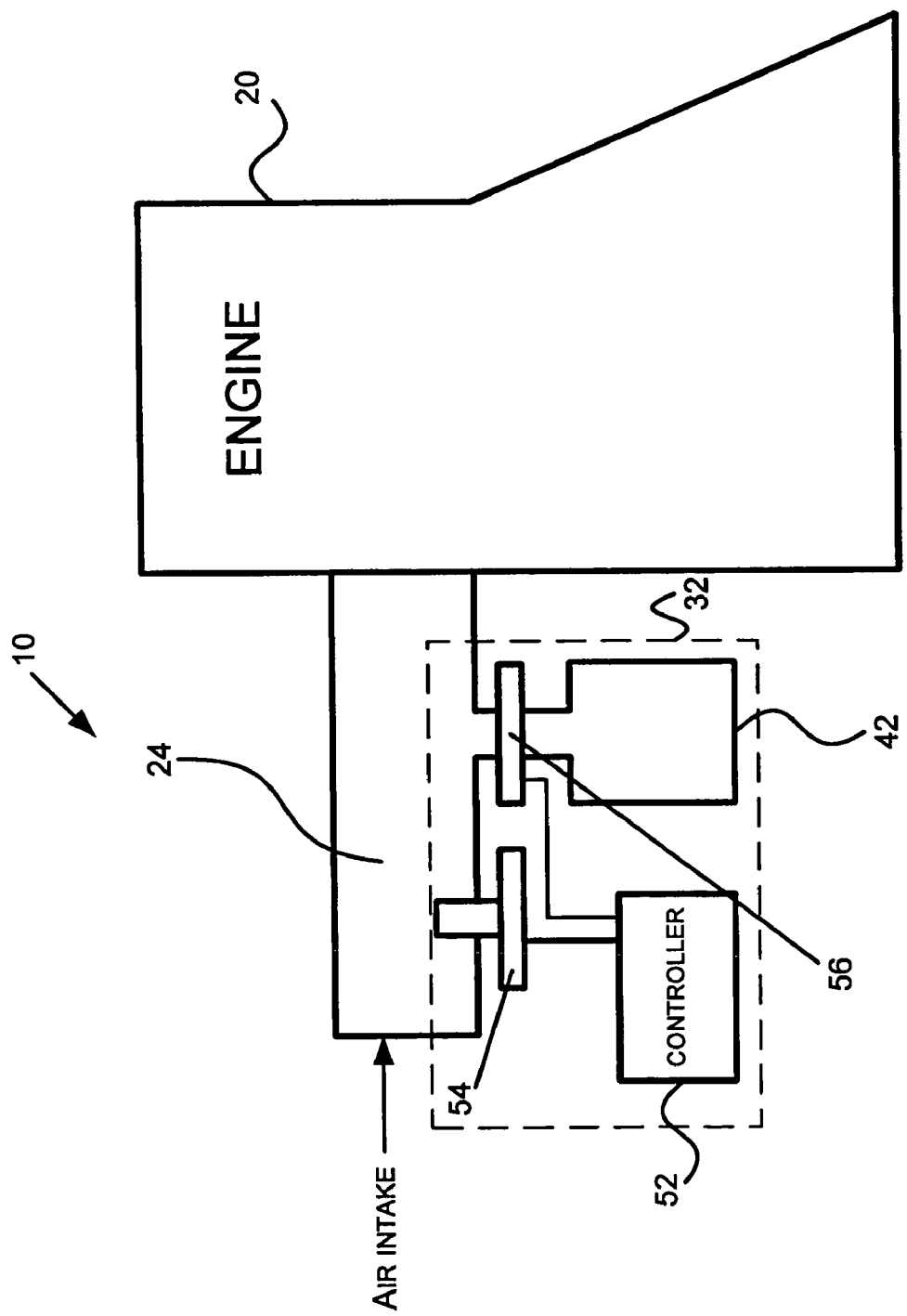
FIG. 2 schematically illustrates a system for reducing pollutant emissions of a diesel engine according to an exemplary disclosed embodiment.

FIG. 2 schematically illustrates a diesel engine system capable of implementing the disclosed systems and methods for reducing pollutant emissions (NOx, UHC, PM) of a diesel engine. An exemplary engine system 10 may include a diesel engine 20, an air intake system 24, and an additive supply device 32. Additive supply device 32 may include an additive storage 42, and a controller 52. Engine system 10 may include only one combustion chamber and one associated intake passage, or, multiple combustion chambers with multiple intake passages.

Engine 20 may be configured to receive and combust materials including fuel and air. Additionally, engine 20 may be configured to receive the additive material from additive supply device 32. In one embodiment, the additive material may include carbon dioxide additive. Carbon dioxide additive may be in the form of gas. Carbon dioxide additive should be understood to mean any combination of carbon dioxide with impurities in any proportion appropriate for addition to engine 20. In one embodiment, the carbon dioxide additive may be a mixture of carbon dioxide and other gases or impurities with carbon dioxide in the amount greater than 50 percent by volume.

Air intake system 24 may be fluidly connected to engine 20, and may be configured to draw air from atmosphere or from an air source (e.g., a turbocharger) and provide the air to engine 20. In one embodiment, additive supply device 32 may also be fluidly connected to intake system 24 to supply carbon dioxide additive to intake system 24.

Intake system 24 may be configured to carry substances including, air, carbon dioxide additive to engine 20. Intake system 24 may be opened to engine 20 via intake valve assemblies (not shown) which may open and close, as desired, to facilitate flow of materials (e.g., air and carbon dioxide additive) into engine 20. It should be understood that though additive supply device 32 is depicted in FIG. 2 as being fluidly connected to intake system 24, additive supply device 32 may be located at any suitable location for providing the carbon dioxide additive to engine 20. For example, additive storage 42 may be directly connected to engine 20.

Additive storage 42 may be, for example, a sealed container storing carbon dioxide gas. One of skill in the art will recognize that many types of containers may function adequately and fall within the scope of the current disclosure.

Controller 52 may be configured to control the amount of carbon dioxide gas additive added to engine 20 based on a predetermined ratio of carbon dioxide additive to the intake air. Supply of carbon dioxide additive may occur at timed intervals, continuously, or randomly and may be based on additional determinations made by additive controller 52 such as certain operational conditions of the engine, or required emission regulations.

Controller 52 may be connected to an air flow adjust valve 54 to adjust the amount of the intake air, and an additive flow adjust valve 56 to adjust the amount of carbon dioxide additive to be added to the intake air. Controller 52 may be a mechanical or an electrical based controller configured to control the flow rate of air flow or control the open time of a valve. For example, controller 52 may send electrical signals to additive flow adjust valve 56 causing additive flow adjust valve 56 to open for a first predetermined time at a first predetermined rate, and/or send electrical signals to air flow adjust valve 54 causing air flow adjust valve 54 to open for a second predetermined time at a second predetermined rate. A user may send a request to controller 52 regarding the amount of carbon dioxide to be added into the intake charge, and controller 52 may adjust the amount of carbon dioxide according the user's request. In another embodiment, a sensor may be present in intake system 24 and may indicate the level of carbon dioxide present, and the carbon dioxide additive supply rate may be modified by controller 52 according to the sensed information. One of ordinary skill in the art will recognize that other methods may be used for adding carbon dioxide additive into engine 20 and controlling the amount of the carbon dioxide additive added into engine 20, which may be available and fall within the scope of this disclosure.

EXAMPLE

Figure 3:
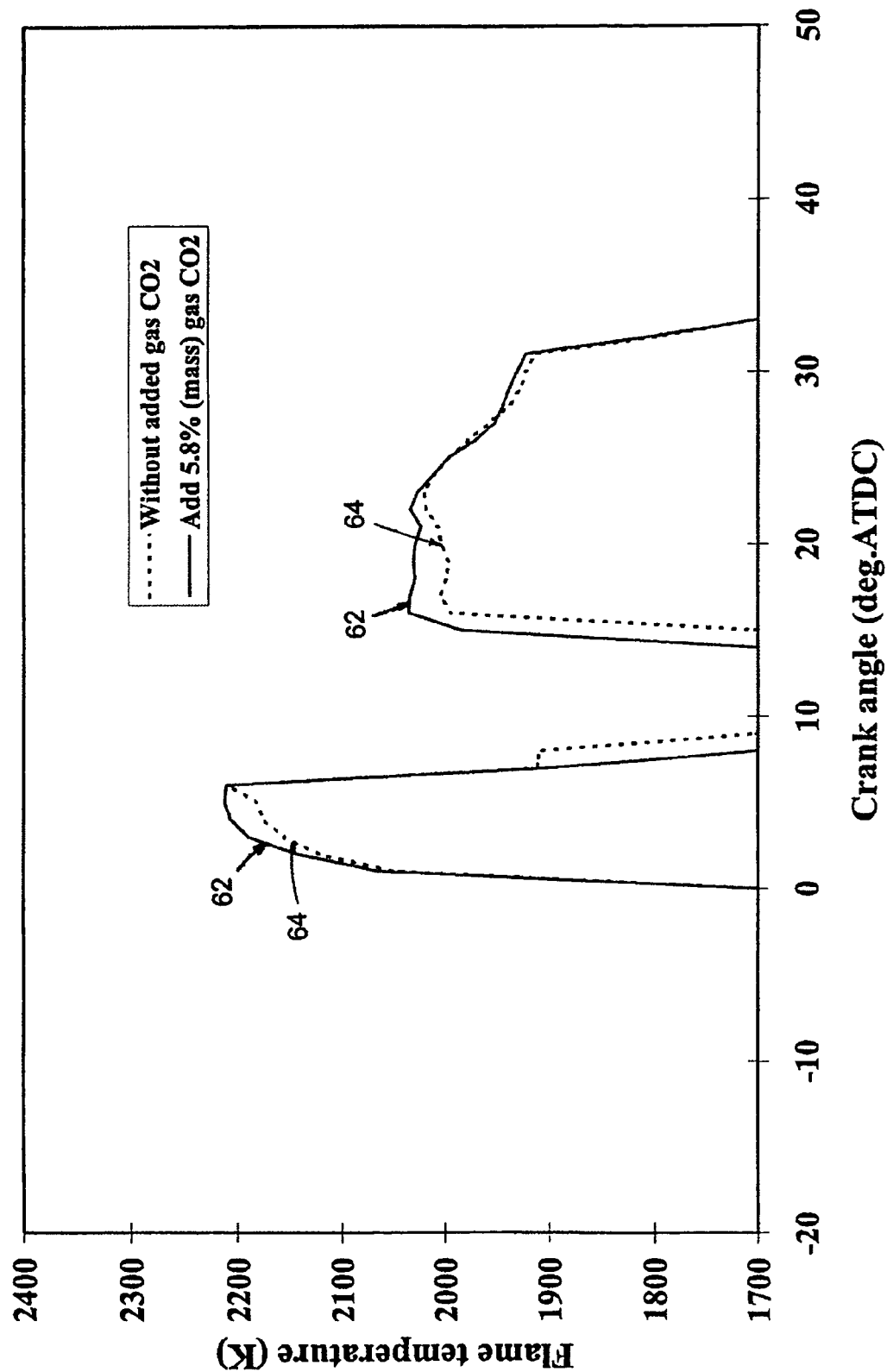
FIG. 3 is a comparison chart of flame temperature in the combustion chamber versus crank angle of the diesel engine.
Figure 4:
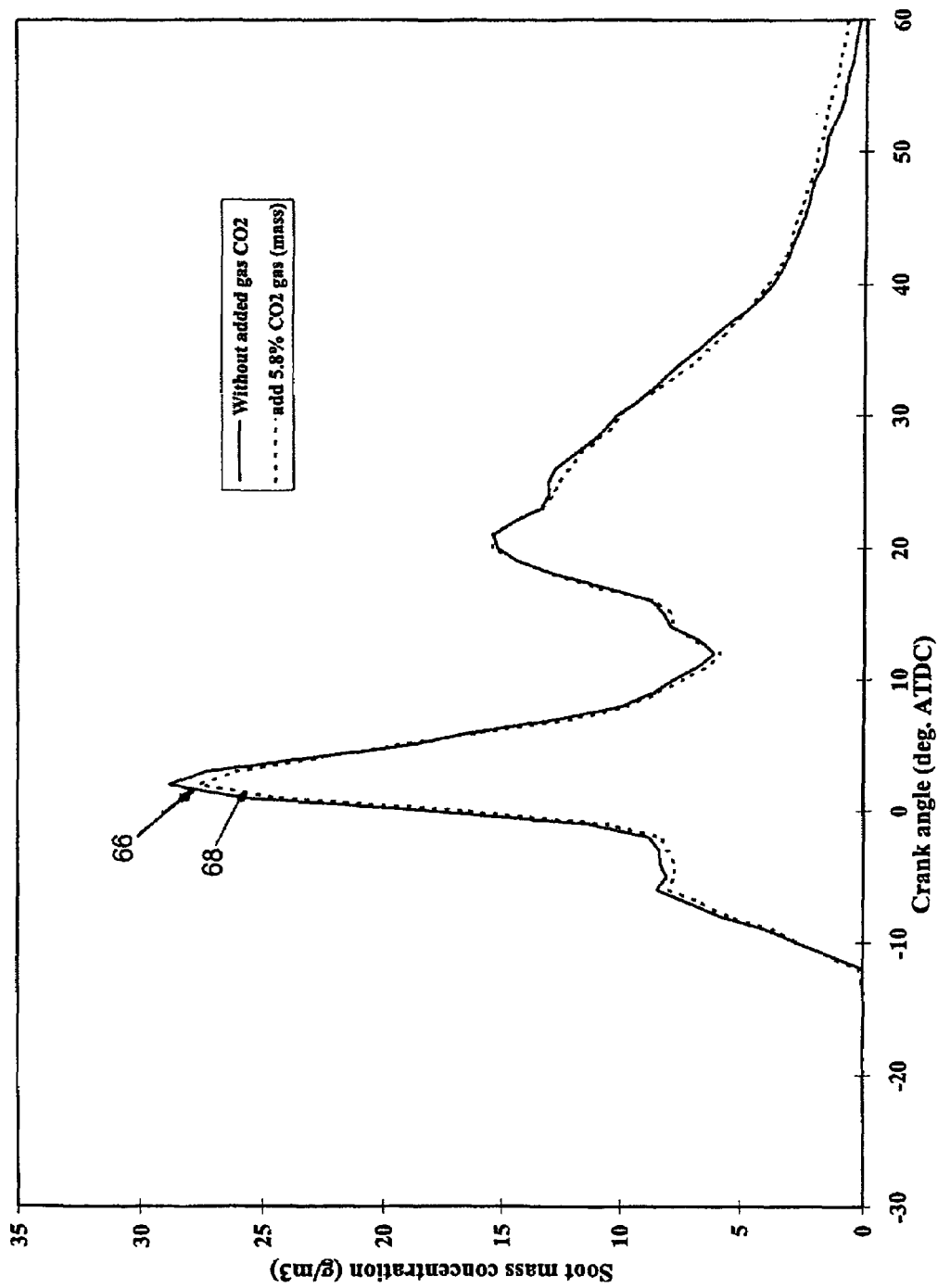
FIG. 4 is a comparison chart of soot mass concentration generated in the combustion chamber versus crank angle of the diesel engine.

Tables 1-3 and FIGS. 3 and 4 show tests conducted on a single cylinder diesel engine with carbon dioxide added to the engine. The tests show that adding carbon dioxide additive to the intake air is effective in reducing pollutant emissions, e.g., NOx, unburn-hydrocarbon (UHC), and soot, and increasing fuel efficiency in the diesel combustion engine.

TABLE 1

| Added $CO_2$ gas by mass (%) | NOx (ppm) | UHC (ppm) | Smoke (FSN) |
|---|---|---|---|
| 0 | 916.38 | 291 | 3.13 |
| 1.2 | 801.2 | 285 | 3.03 |
| Emission decrease (%) | 12.57 | 2.03 | 3.19 |

Table 1 shows emission levels are reduced in the exhaust gas when 1.2% carbon dioxide gas (by mass) is added to the intake air in system 24, (at air flow rate 5.06 g/s, engine speed 1500 rpm, and engine power 0.85 kw). Compared to no extra carbon dioxide additive being added to the intake air, the emission of NOx is reduced by 12.57% (from 916.4 ppm to 801.2 ppm), the emission of UHC is reduced by 2.03% (from 291 ppm to 285 ppm), and the smoke/soot is reduced by 3.19% (from 3.13 FSN (filter smoke number) to 3.03 FSN).

TABLE 2

| Added $CO_2$ gas by mass (%) | NOx (ppm) | UHC (ppm) | Smoke (FSN) |
|---|---|---|---|
| 0 | 664 | 438 | 4.42 |
| 3.5 | 492 | 376 | 4.19 |
| Emission decrease (%) | 17.8 | 14.2 | 5 |

Table 2 shows 3.5% carbon dioxide gas (by mass) is added to the intake air in system 24 (at air flow rate 4.53 g/s, engine speed 1500 rpm, and engine power 0.85 kw). Compared to no extra carbon dioxide additive being added to the intake air, the emission of NOx is reduced by 17.8% (from 664 ppm to 492 ppm), the emission of UHC is reduced by 14.2% (from 438 ppm to 376 ppm), and the smoke/soot is reduced by 5% (from 4.42 FSN to 4.19 FSN).

TABLE 3

| Added CO2 gas by mass (%) | NOx (ppm) | UHC (ppm) | Smoke (FSN) |
|---|---|---|---|
| 0 | 415 | 447 | 4.99 |
| 5.8 | 312 | 382 | 4.49 |
| Emission decrease (%) | 24.8 | 14.5 | 10 |

As shown in Table 3, 5.8% carbon dioxide gas (by mass) is added to intake charge (air flow rate 3.99 g/s, engine speed 1500 rpm, engine power 0.85 kw). Compared to no extra carbon dioxide additive being added to the intake air, the emission of NOx is reduced by 24.8% (from 415 ppm to 312 ppm), the emission of UHC is reduced by 14.5% (from 447 ppm to 382 ppm), and the smoke/soot is reduced by 10% (from 4.99 FSN to 4.49 FSN).

FIG. 3 shows a comparison chart for flame temperature in the combustion chamber versus crank angle of the engine. Curve 62 represents flame temperature as a function of crank angle when there is no carbon dioxide gas added in the intake air. Curve 64 represents flame temperature as a function of crank angle when 5.8% carbon dioxide gas (by mass) is added to the intake air. As shown in FIG. 3, when 5.8% carbon dioxide gas (by mass) is added to the intake system (air flow rate 3.99 g/s, engine speed 1500 rpm, engine power 0.85 kw), the flame temperature (peak temperature) of the combustion chamber in engine 20 is reduced. This may explain why the NOx is reduced significantly as shown above, because lower combustion temperature may inhibit formation of NOx.

In addition, the total soot mass concentration in engine 20 may be reduced. FIG. 4 shows a comparison chart for soot mass concentration ($g/m^3$) generated in the combustion chamber versus crank angle of the engine. Curve 66 represents soot concentration as a function of crank angle when there is no carbon dioxide gas added in the intake air. Curve 68 represents soot concentration as a function of crank angle when 5.8% carbon dioxide gas (by mass) is added to the intake air. The reduction of soot mass concentration may be mainly due to thermal dissociation of carbon dioxide that may produce oxygen and the availability of oxygen may assist with soot oxidation, and improve fuel combustion.

The above results show that emission reductions of NOx, UHC, and soot may be achieved when an amount of carbon dioxide is added to the intake air in a single cylinder diesel engine. The disclosed system and method may also be used in multiple-cylinder engine systems. When the disclosed system and method are used in a multiple-cylinder diesel engine, a larger amount of carbon dioxide may be added to the intake air to achieve substantially the same results. The ratio of carbon dioxide to intake air may vary based on the diesel engine's size (power) and required emission levels. A preferred range of ratios of carbon dioxide to intake air may be 1:100 to 50:100. One of skill in the art will recognize that the above effects may vary based on the various ratio of carbon dioxide added to the intake charge.

INDUSTRIAL APPLICABILITY

The disclosed systems and methods may be applicable to diesel engines. The disclosed systems and methods may allow directly reducing combustion emissions (e.g., NOx, UHC, and smoke) in-cylinder without after-treatment, and improving diesel fuel efficiency, reducing combustion noise of diesel engines, and decreasing engine cost. The operation of the disclosed systems and methods will now be explained.

Figure 5:
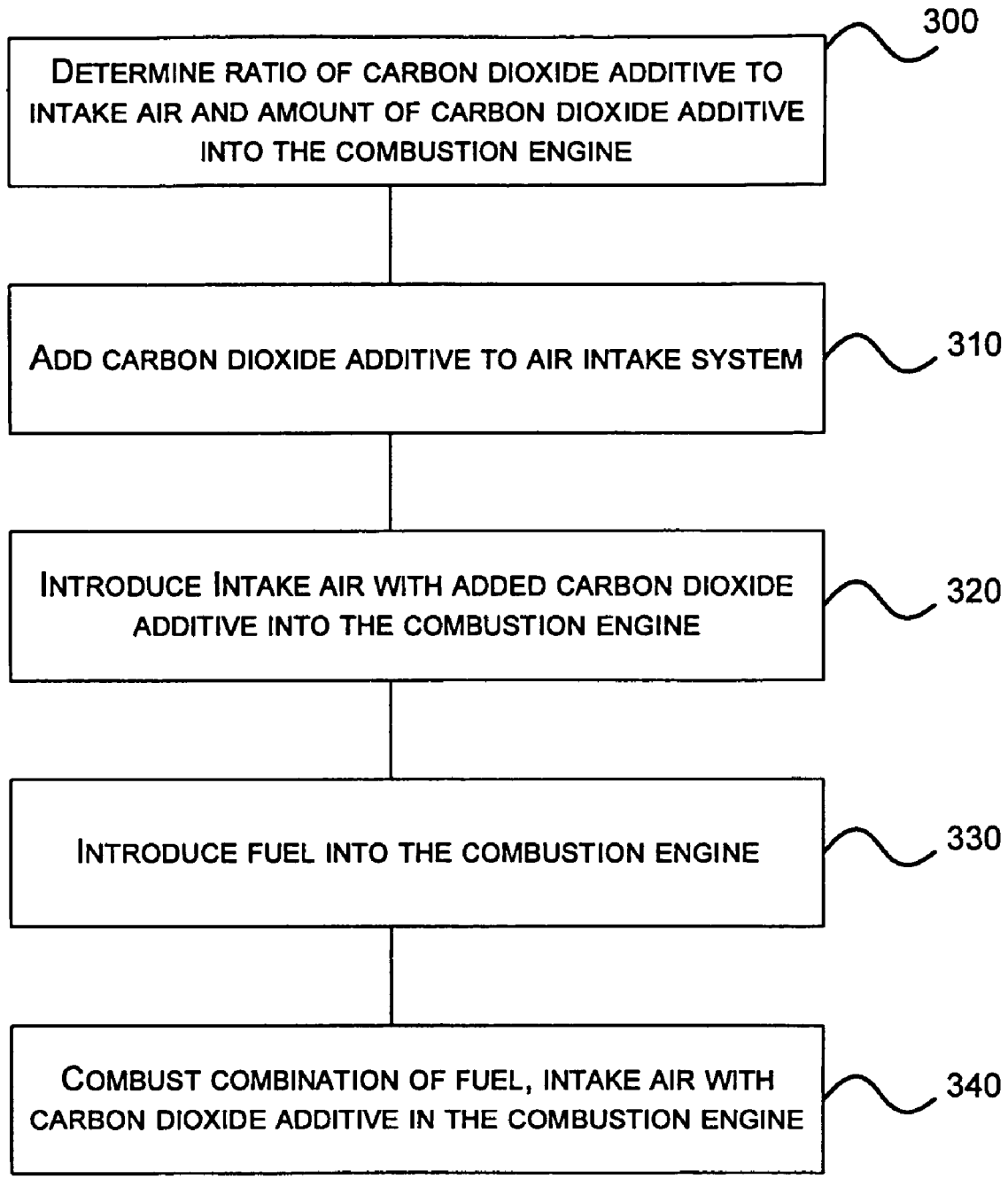
FIG. 5 is a flow chart illustrating an exemplary disclosed method of reducing pollutant emissions of a diesel engine.

FIG. 5 is a flowchart depicting one exemplary method according to the disclosure. At step 310, a predetermined amount of carbon dioxide gas (measured by volume or mass) may be added to air intake system 24. In one embodiment, controller 52 may cause additive flow adjust valve 56 to open and supply the predetermined amount of carbon dioxide additive into air intake system 24 at step 310. The intake air with certain amount of carbon dioxide additive is then introduced into engine 20 at step 320. Fuel may be supplied to engine 20 at step 330. Following the supply of the air and fuel, combustion of the materials within engine 20 may be initiated at step 340.

Several advantages may be associated with the disclosed systems and methods for reducing pollutant emissions of a power system. For example, the disclosed systems and methods may reduce the combustion emissions, e.g., NOx, UHC, soot, at the same time, while most of the prior art solutions may only reduce NOx. Further, the disclosed systems and methods may directly reduce the combustion emissions (NOx, UHC, and smoke) from the diesel combustion process in-cylinder, while most of the prior art methods may only reduce the emissions by using after-treatment. Furthermore, use of carbon dioxide additives may lead to significant cost savings due to the low cost of manufacturing carbon dioxide and attaching containers of carbon dioxide to the intake system of the engine system, compared to the prior systems and methods. The disclosed systems and methods may provide other benefits such as, improve diesel fuel efficiency, reduce combustion noise of diesel engines, and decrease engine cost, compared to the prior systems and methods.

It will be apparent to those skilled in the art that various modifications and variations can be made to the disclosed system and methods for reducing pollutant emissions of an engine. Other embodiments will be apparent to those skilled in the art from consideration of the specification and practice of the disclosed systems and methods for reducing pollutant emissions of an engine. It is intended that the specification and examples be considered as exemplary only, with a true scope being indicated by the following claims and their equivalents.

What is claimed is:

1. A system for reducing pollutant emissions of a power system, the system comprising:
   an engine;
   an intake system fluidly connected to the engine for supplying air into the engine;
   a carbon dioxide supply fluidly connected to the intake system;
   a valve connected to the intake system; and
   a controller operatively coupled to the carbon dioxide supply and the intake system valve, wherein the controller is configured to control the ratio of the carbon dioxide to air introduced into the engine by regulating the air intake valve to control the amount of air flowing into the engine.

2. The system of claim 1, wherein the controller is coupled to a valve associated with the carbon dioxide supply and configured to control the amount of the carbon dioxide flowing into the engine.

3. The system of claim 1, wherein the engine is a diesel engine.

4. The system of claim 1, wherein the carbon dioxide supply includes about over 50 percent carbon dioxide gas by volume.

5. The system of claim 1, wherein the carbon dioxide supply includes substantially pure carbon dioxide.

6. The system of claim 1, wherein the controller is configured to control the ratio of the carbon dioxide to the intake air to about 1:100 to 50:100 by mass.

7. A method for reducing pollutant emissions of an engine system, the method comprising:
   providing air through an air intake system to an engine;
   providing carbon dioxide from a carbon dioxide supply to the engine;
   providing fuel to the engine;
   controlling air flow through a valve connected to the intake system to determine a ratio of carbon dioxide to air provided to the engine; and
   combusting the mixture of the fuel, air, and carbon dioxide within the engine. combusting the mixture of the fuel,, and carbon dioxide within the engine.

8. The method of claim 7, further including providing the carbon dioxide in a controllable amount.

9. The method of claim 7, further including controlling a ratio of the carbon dioxide to air provided to the engine.

10. The method of claim 9, wherein controlling the ratio of the carbon dioxide to the air includes controlling the carbon dioxide flow by a valve associated with the carbon dioxide supply.

11. The method of claim 9, wherein the ratio of the carbon dioxide to the air is about 1:100 to 50:100 by mass.

12. The method of claim 7, further including determining a ratio of carbon dioxide to air, wherein the providing of air and the providing of carbon dioxide are based on the determined ratio of the carbon dioxide to the air.

13. A machine system, comprising:
   an engine system;
   an air intake system fluidly connected to the engine system;
   a carbon dioxide supply fluidly connected to the air intake system; and
   a controller operatively connected to the air intake system and the carbon dioxide supply to control a ratio of carbon dioxide to air, the controller including a first valve connected to the intake system and configured to control the air flowing into the air least one engine, and a second valve connected to the carbon dioxide supply and configured to control the carbon dioxide flowing into at least one engine.

14. The system of claim 13, wherein the engine system is a diesel engine system.

15. The system of claim 13, wherein the carbon dioxide supply includes about over 50 percent carbon dioxide gas by volume.

16. The system of claim 13, wherein the carbon dioxide supply includes substantially pure carbon dioxide.

17. The system of claim 13, wherein the controller is configured to control the ratio of the carbon dioxide to the intake air of about 1:100 to 50:100 by mass.

18. The system of claim 13, wherein the engine system includes a diesel engine.

* * * * *